US012726033B2

(12) United States Patent
Okada et al.

(10) Patent No.: US 12,726,033 B2

(45) Date of Patent: Sep. 1, 2026

(54) POWER GENERATION SYSTEM AND FLIGHT VEHICLE

(71) Applicant: SoftBank Corp., Tokyo (JP)

(72) Inventors: Kohei Okada, Tokyo (JP); Marika Ueda, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 19/218,635

(22) Filed: May 27, 2025

(65) Prior Publication Data

US 2025/0286399 A1 Sep. 11, 2025

Related U.S. Application Data

(63) Continuation of application No. PCT/JP2023/040773, filed on Nov. 13, 2023.

(30) Foreign Application Priority Data

Dec. 1, 2022 (JP) ................................. 2022-193171

(51) Int. Cl.

*H02J 7/34* (2006.01)
*B64D 27/353* (2024.01)

(Continued)

(52) U.S. Cl.

CPC ............ *H02J 7/345* (2013.01); *B64D 27/353* (2024.01); *H02J 7/94* (2026.01)

(58) Field of Classification Search

None

See application file for complete search history.

(56) References Cited

U.S. PATENT DOCUMENTS

2014/0091628 A1* 4/2014 Thompson .............. H02J 3/381 307/66
2016/0244144 A1* 8/2016 Karem .................... B64C 3/546

(Continued)

FOREIGN PATENT DOCUMENTS

JP 2020090852 A 6/2020
JP 2021193871 A 12/2021

(Continued)

OTHER PUBLICATIONS

Office Action issued for counterpart Japanese Application No. 2022-193171, transmitted from the Japanese Patent Office on Jan. 9, 2024 (drafted on Dec. 27, 2023).

(Continued)

*Primary Examiner* — Daniel C Puentes
*Assistant Examiner* — Aqeel H Bukhari

(57) ABSTRACT

Provided is a power generation system including a photovoltaic unit arranged in a flight vehicle which provides a wireless communication service to a user terminal in a communication area formed over a ground, an electric storage unit which is connected to the photovoltaic unit and stores electric power generated by the photovoltaic unit, and a power conditioner which converts the electric power generated by the photovoltaic unit. The electric storage unit is connected, for example, in parallel to connection between the photovoltaic unit and the power conditioner, and the electric power stored in the electric storage unit is supplied to the power conditioner.

13 Claims, 11 Drawing Sheets

(51) Int. Cl.

| | |
|---|---|
| ***H02J 3/38*** | (2026.01) |
| ***H02J 7/00*** | (2026.01) |
| ***H02J 7/94*** | (2026.01) |

(56) References Cited

U.S. PATENT DOCUMENTS

| | | | | |
|---|---|---|---|---|
| 2016/0311545 | A1* | 10/2016 | Parks | B64D 27/353 |
| 2016/0322827 | A1 | 11/2016 | Gupta | |
| 2019/0100321 | A1* | 4/2019 | Sun | B64D 27/34 |
| 2021/0021134 | A1* | 1/2021 | Alipoor | H02J 7/0013 |
| 2021/0065562 | A1* | 3/2021 | Tajika | G08G 5/21 |
| 2022/0032780 | A1* | 2/2022 | Zheng | H02J 7/35 |

FOREIGN PATENT DOCUMENTS

| | | | |
|---|---|---|---|
| JP | 2022090852 | A | 6/2022 |
| JP | 2022101358 | A | 7/2022 |
| JP | 2022159662 | A | 10/2022 |

OTHER PUBLICATIONS

Decision to Grant a Patent issued for counterpart Japanese Application No. 2022-193171, transmitted from the Japanese Patent Office on Mar. 19, 2024 (drafted on Mar. 13, 2024).

Office Action issued for counterpart Chinese Application 202380083027.9, issued by the State Intellectual Property Office of People's Republic of China on Apr. 1, 2026.

Rosu Hamzescu et al., Practical Guide to Implementing Solar Panel MPPT Algorithms, Dec. 31, 2013 pp. 1-16, XP093372088, Microchip Technology Inc. USA.

* cited by examiner

POWER GENERATION SYSTEM AND FLIGHT VEHICLE

The contents of the following patent application(s) are incorporated herein by reference: NO. 2022-193171 filed in JP on Dec. 1, 2022 NO. PCT/JP2023/040773 filed in WO on Nov. 13, 2023.

BACKGROUND

1. Technical Field

The present invention relates to a power generation system and a flight vehicle.

2. Related Art

Patent document 1 describes a technique for increasing a recovery rate or a utilization rate of generated power of a power generation apparatus such as a solar power generation panel.

PRIOR ART DOCUMENTS

Patent Document

Patent Document 1: Japanese Patent Application Publication No. 2020-090852

DESCRIPTION OF EXEMPLARY EMBODIMENTS

Since a converter directly connected to a solar cell needs input electric power at or above a certain level, in bad weather or when brightness is not at certain level, the converter cannot efficiently convert weak electric power in many cases, and power generation may be stopped. In a stratospheric platform such as an HAPS (High Altitude Platform Station) to which a solar power generation panel is mounted and which flies in a stratosphere and forms a wireless communication area over a ground, weak electric power is likely to be generated due to an influence from a shape or a bearing of an airframe or a balloon, a time of day (how the sun shines), or the like, and an amount of wasted electric power is expected to be large. According to the present embodiment, an electric storage unit which recovers weak electric power is introduced to a power generation system of the stratospheric platform.

Hereinafter, the present invention will be described through embodiments of the invention, but the following embodiments do not limit the invention according to claims. In addition, not all of the combinations of features described in the embodiments are essential to the solution of the invention.

Figure 1:
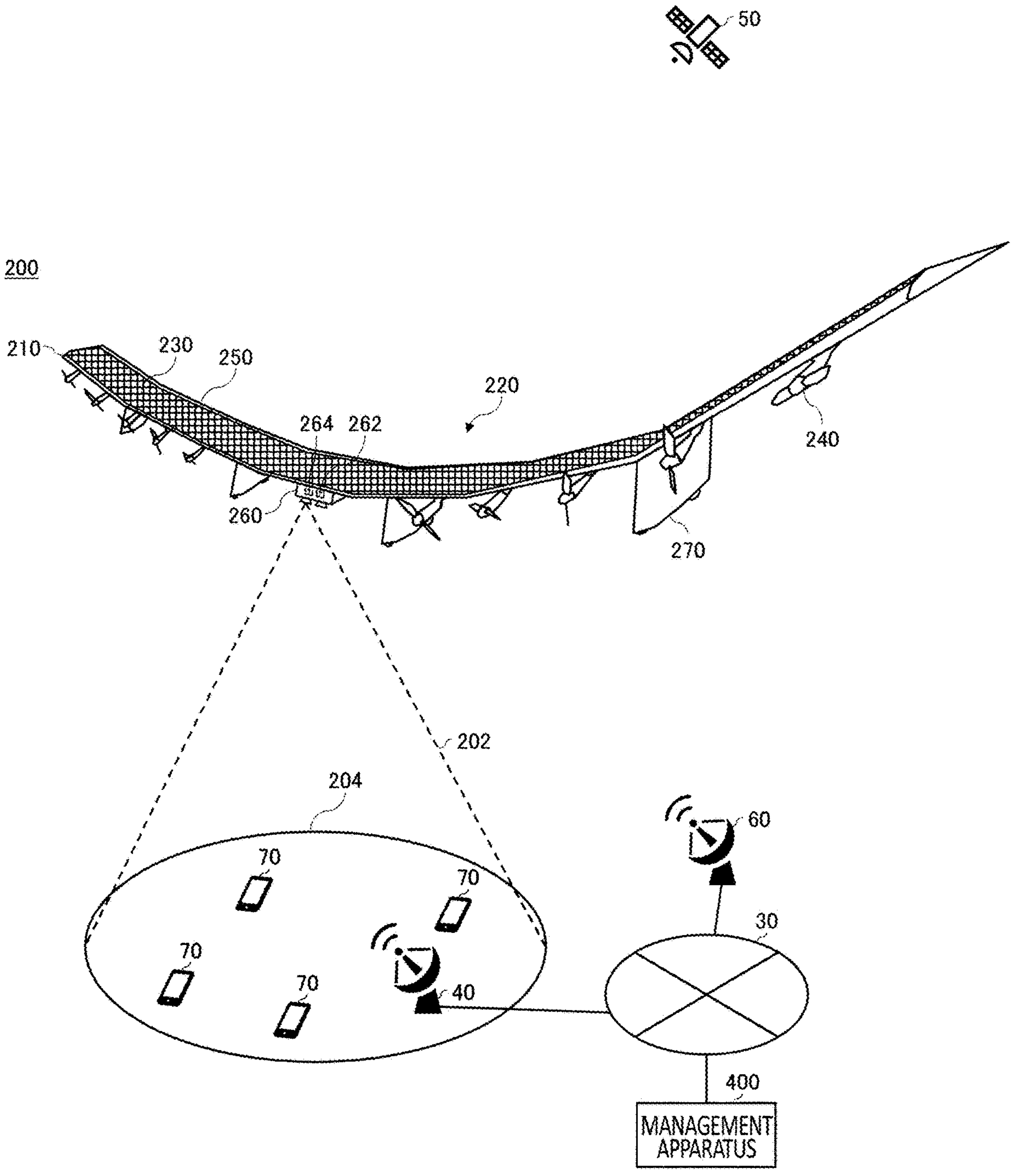
FIG. 1 schematically illustrates an example of an HAPS 200.

FIG. 1 schematically illustrates an example of an HAPS 200. The HAPS 200 may be an example of a flight vehicle which provides a wireless communication service to a user terminal 70 in a communication area 204 formed by emitting a beam 202 towards the ground.

The HAPS 200 includes a wing portion 220, a photovoltaic unit 230, a propeller 240, an elevator 250, a central portion 260, and a pod 270.

The photovoltaic unit 230 includes a photovoltaic panel which receives light to generate electric power. The photovoltaic panel may be so-called a solar power generation panel. The photovoltaic unit 230 may be constituted by a plurality of photovoltaic panels. The photovoltaic unit 230 may include a plurality of strings in which a plurality of photovoltaic panels are connected.

The HAPS 200 includes a plurality of batteries 280 which are not illustrated in the drawing. The plurality of batteries 280 are distributed to be arranged in all or some of the wing portion 220, the central portion 260, and the pod 270. The plurality of batteries 280 are charged by the electric power generated by the photovoltaic unit 230.

A flight control apparatus 262 and a communication control apparatus 264 are arranged in the central portion 260. The flight control apparatus 262 controls flight of the HAPS 200. The communication control apparatus 264 controls communication of the HAPS 200.

The flight control apparatus 262 controls the flight of the HAPS 200 by controlling rotation of the propeller 240, for example. In addition, the flight control apparatus 262 controls the flight of the HAPS 200 by changing an angle of the elevator 250, for example. The flight control apparatus 262 may include various sensors such as a positioning sensor like a GPS sensor, a gyro sensor, an acceleration sensor, and a wind speed sensor and manage a position, an attitude, a movement direction, and a movement speed of the HAPS 200 and a wind speed around the HAPS 200.

The communication control apparatus 264 forms the communication area 204 over the ground by using an SL (Service Link) antenna. The communication control apparatus 264 may form a service link with the user terminal 70 on the ground by using the SL antenna. The SL antenna may be a multi-beam antenna. The communication area 204 may be a multi-cell.

The communication control apparatus 264 may form a feeder link with a gateway 40 on the ground by using an FL (Feeder Link) antenna. The communication control apparatus 264 may access a network 30 via the gateway 40.

The communication control apparatus 264 may communicate with a communication satellite 50 by using a satellite communication antenna. The communication control apparatus 264 may access the network 30 via the communication satellite 50 and a satellite communication station 60.

The communication control apparatus 264 may communicate with the communication control apparatus 264 mounted to another HAPS 200 via the gateway 40 or the communication satellite 50 and the network 30.

The user terminal 70 may be any communication terminal as long as it can communicate with the HAPS 200. For example, the user terminal 70 is a mobile phone such as a smartphone. The user terminal 70 may also be a tablet terminal, a PC (Personal Computer), and the like. The user terminal 70 may also be a so-called IoT (Internet of Things) device. The user terminal 70 can include anything that corresponds to so-called IoE (Internet of Everything).

The HAPS 200 relays a communication between the network 30 and the user terminal 70, for example, via the feeder link or the communication satellite 50 and the service link. The HAPS 200 may provide a wireless communication service to the user terminal 70 by relaying the communication between the user terminal 70 and the network 30.

The network 30 includes a mobile communication network. The mobile communication network may conform to any of an LTE (Long Term Evolution) communication system, a 5G (5th Generation) communication system, a 3G (3rd Generation) communication system, and a 6G (6th Generation) communication system and a communication system of the subsequent generation. The network 30 may include the Internet.

For example, the HAPS 200 transmits data received from the user terminal 70 in the communication area 204 to the network 30. In addition, for example, when the HAPS 200 receives data addressed to the user terminal 70 in the communication area 204 via the network 30, the HAPS 200 transmits the data to the user terminal 70. The HAPS 200 may relay communication of another HAPS 200. For example, the HAPS 200 directly wirelessly communicates with another HAPS 200 to transmit, via the network 30, data received from the other HAPS 200 or transmit data received from the network 30 to the other HAPS 200.

A management apparatus 400 manages a plurality of the HAPS 200. The management apparatus 400 may communicate with the HAPS 200 via the network 30 and the gateway 40. The management apparatus 400 may communicate with another HAPS 200 via the network 30, the gateway 40, and one of the HAPS 200. The management apparatus 400 may communicate with the HAPS 200 via the network 30, the satellite communication station 60, and the communication satellite 50.

The management apparatus 400 controls the HAPS 200 by transmitting an instruction. The management apparatus 400 may cause the HAPS 200 to circle over a target area such that the target area on the ground is covered by the communication area 204. For example, the HAPS 200 maintains the feeder link with the gateway 40 by adjusting a pointing direction of the FL antenna while flying in a circular orbit over the target area and maintains a coverage of the target area by the communication area 204 by adjusting a pointing direction of the SL antenna.

Figure 2:
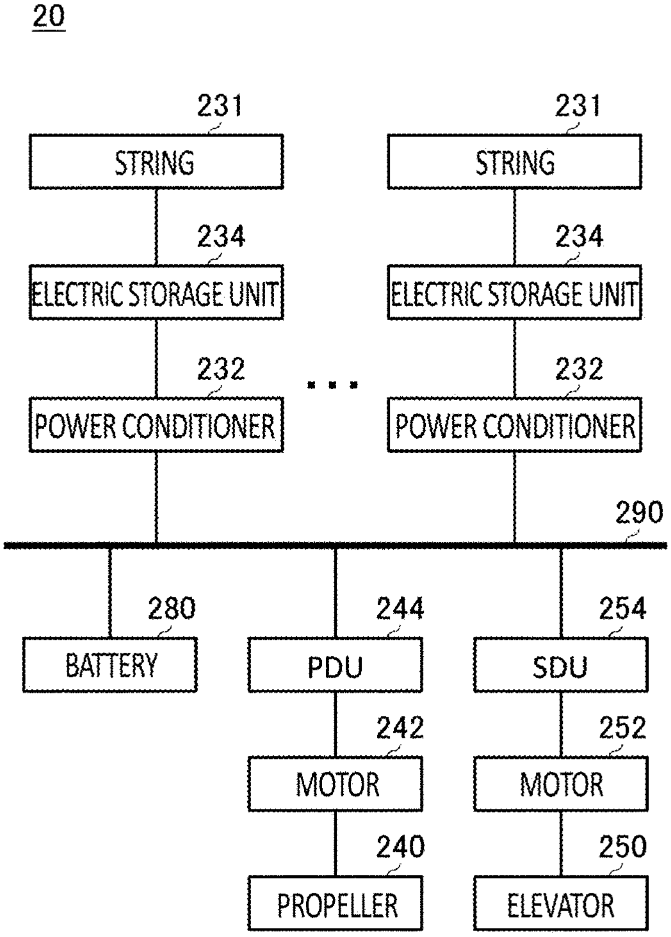
FIG. 2 is an explanatory diagram for describing a power generation system 20 included in the HAPS 200.

FIG. 2 is an explanatory diagram for describing a power generation system 20 included in the HAPS 200. The power generation system 20 exemplified in FIG. 2 includes a string 231 in which a plurality of power generation panels are connected and a power conditioner 232 which converts electric power generated by the string 231, and further includes an electric storage unit 234 which is connected to the string 231 and stores the electric power generated by the string 231. As exemplified in FIG. 2, the power generation system 20 may include a plurality of combinations of the strings 231, the power conditioners 232, and the electric storage units 234. Examples of the power conditioner 232 include an MPPT (Maximum Power Point Tracking).

The power generation system 20 may include a photovoltaic panel instead of the string 231. Examples of the electric storage unit 234 include a capacitor, a super capacitor, a condenser, a battery, and the like.

The plurality of power conditioners 232 may be connected to a bus 290. As exemplified in FIG. 2, a PDU (Power Distribution Unit) 244, a motor 242, and the propeller 240, an SDU (State Distribution Unit) 254, a motor 252, and the elevator 250, and a battery 280 may be connected to the bus 290. In addition, optional apparatuses such as a flight control apparatus, an antenna, and a light (none of which are illustrated in the drawing) may be connected to the bus 290.

The HAPS 200 flies in a predetermined range of the stratosphere, for example, and the string 231 generates electric power by sunlight, but due to various factors, a power generation amount may be reduced. For example, at the time of sunrise or sunset, since solar radiation reaching the string 231 is weak, the power generation amount by the string 231 is reduced. In addition, since the wing portion 220 of the HAPS 200 has a curved shape, even in a daytime, depending on the attitude of the HAPS 200, the power generation amount by the string 231 may be reduced. In addition, the solar radiation reaching the string 231 is reduced as the distance of the flight area of the HAPS 200 from the vicinity of the equator increases. In addition, depending on a season, the solar radiation reaching the string 231 may be reduced.

Since the power conditioner 232 connected to the string 231 in this example supplies electric power to the motor 242, the motor 252, and the like, a relatively high output is required. The power conditioner 232 requires an input electric power at a certain level or above and cannot convert the input electric power into output electric power when the electric power amount is lower than a certain amount. In this manner, electric power less than minimum electric power that can be converted to output electric power by the power conditioner 232 may be described as weak electric power. When the electric power generated by the string 231 is the weak electric power, even when the string 231 generates electric power, the electric power ends up being wasted.

In contrast to the above, the power generation system 20 according to the present embodiment recovers the weak electric power by the electric storage unit 234.

Figure 3:
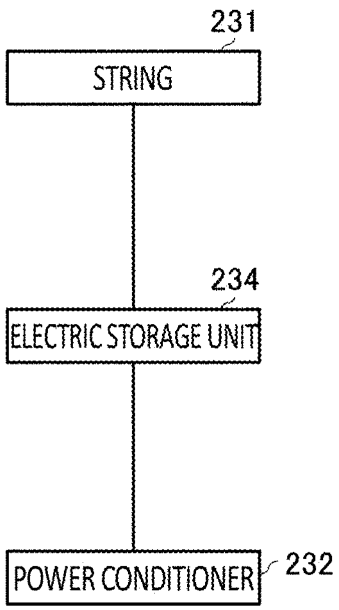
FIG. 3 schematically illustrates an example of an arrangement of an electric storage unit 234.

FIG. 3 schematically illustrates an example of an arrangement of the electric storage unit 234. In the example illustrated in FIG. 3, the electric storage unit 234 is connected in series to the string 231 and the power conditioner 232. The electric power generated by the string 231 is stored in the electric storage unit 234, and the electric power stored in the electric storage unit 234 is supplied to the power conditioner 232.

In a case where the string 231 outputs weak electric power, when it is supplied to the power conditioner 232 as in related art, the weak electric power cannot be converted into the output electric power in the power conditioner 232, and the weak electric power is wasted. In contrast to the above, according to the power generation system 20 illustrated in FIG. 3, the electric power generated by the string 231 is stored in the electric storage unit 234 to become consolidated electric power which then flows to be supplied to the power conditioner 232, so that waste of the weak electric power can be avoided.

In the example illustrated in FIG. 3, the power conditioner 232 may control whether or not the electric power from the electric storage unit 234 is to be received. The power conditioner 232 may adjust, by a switch or the like, whether or not the electric power from the electric storage unit 234 is to be received. For example, the power conditioner 232 may acquire a measurement result of the power generation amount by the string 231 and perform control in a manner that the electric power is to be received from the electric storage unit 234 when the measurement result is higher than a predetermined threshold, and the electric power from the electric storage unit 234 is not to be received when the measurement result is lower than the threshold. The power conditioner 232 may acquire a measurement result by an ammeter arranged between the string 231 and the electric storage unit 234, for example. By performing such control, for example, while the string 231 outputs the weak electric power, the weak electric power can be stored in the electric storage unit 234, and when the string 231 outputs the electric power higher than the weak electric power, the electric power can be supplied to the power conditioner 232.

Figure 4:
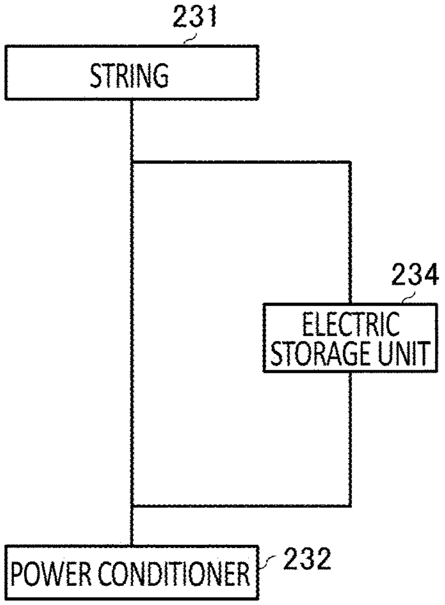
FIG. 4 schematically illustrates an example of the arrangement of the electric storage unit 234.

FIG. 4 schematically illustrates an example of the arrangement of the electric storage unit 234. In the example illustrated in FIG. 4, the electric storage unit 234 is connected in parallel to connection between the string 231 and the power conditioner 232. The electric power stored in the electric storage unit 234 is supplied to the power conditioner 232.

As illustrated in FIG. 4, by arranging the electric storage unit 234 to the connection between the string 231 and the power conditioner 232, the weak electric power generated by the string 231 can be stored in the electric storage unit 234.

Figure 5:
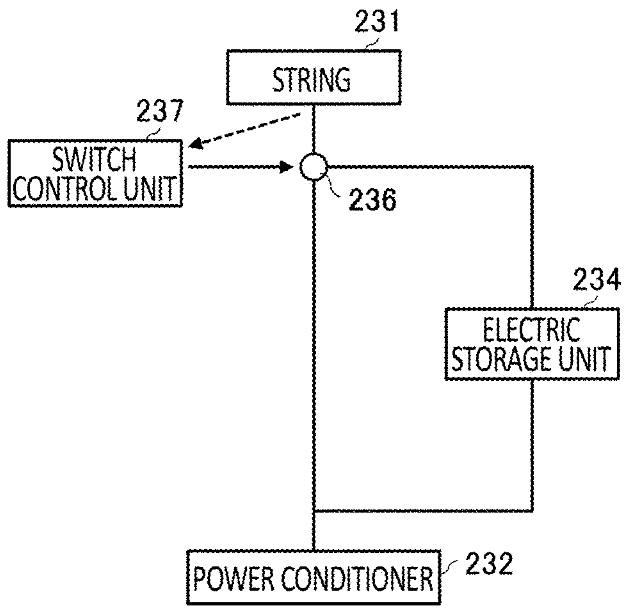
FIG. 5 schematically illustrates an example of the arrangement of the electric storage unit 234.

FIG. 5 schematically illustrates an example of the arrangement of the electric storage unit 234. In the example illustrated in FIG. 5, the power generation system 20 includes a switch unit 236 and a switch control unit 237.

The switch unit 236 may be a switch which switches the current from the string 231 to be supplied to the power conditioner 232 or to be supplied to the electric storage unit 234. As exemplified in FIG. 4, the switch unit 236 may be arranged at a position branching from the connection between the string 231 and the power conditioner 232 to the electric storage unit 234. The switch unit 236 may be arranged at another position along a way to the connection between the string 231 and the electric storage unit 234.

By controlling the switch unit 236, the switch control unit 237 switches the current of the string 231 to be supplied to the power conditioner 232 or to be supplied to the electric storage unit 234. In the example illustrated in FIG. 5, the switch control unit 237 acquires a measurement result of the power generation amount by the string 231 and switches the switch unit 236 in a manner that the current from the string 231 is to be supplied to the power conditioner 232 when the measurement result is higher than a predetermined threshold or the current from the string 231 is to be supplied to the electric storage unit 234 when the measurement result is lower than the threshold. The threshold may be a value with which it can be determined on whether or not the measurement result corresponds to a weak current. The switch control unit 237 may acquire a measurement result by an ammeter arranged between the string 231 and the switch unit 236, for example.

When the switch control unit 237 performs such switching, in a case where the electric power generated by the string 231 is the weak electric power, all the weak electric power can be stored in the electric storage unit 234, and the weak electric power can be effectively used. In addition, when the sufficient electric power is generated by the string 231, it is possible to cause the current to flow through the power conditioner 232 without causing the current to flow through the electric storage unit 234, and life of the electric storage unit 234 can be extended as compared to a case where the switching is not performed.

Figure 6:
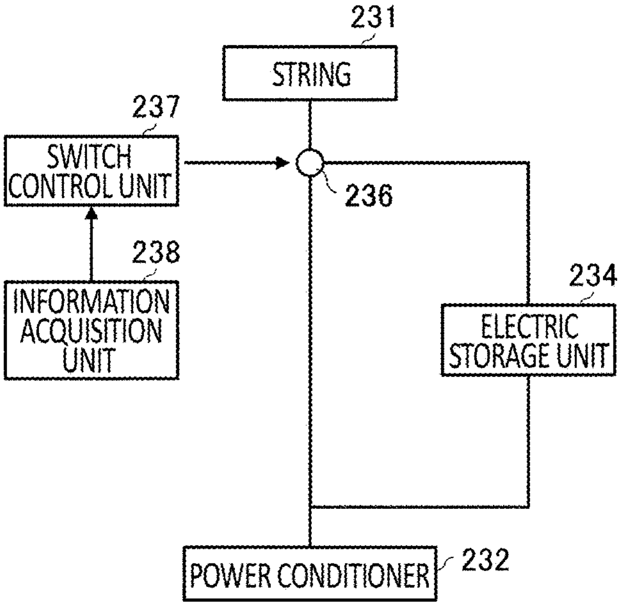
FIG. 6 schematically illustrates an example of the arrangement of the electric storage unit 234.

FIG. 6 schematically illustrates an example of the arrangement of the electric storage unit 234. Here, differences from FIG. 5 will be mainly described. In the example illustrated in FIG. 6, the power generation system 20 further includes an information acquisition unit 238.

The information acquisition unit 238 acquires flight related information in connection to the flight of the HAPS 200. The flight related information may include a time period in which the HAPS 200 flies.

The information acquisition unit 238 may acquire the flight related information from the flight control apparatus 262. The flight related information includes, for example, a flight position of the HAPS 200. When the HAPS 200 flies on a particular path, the flight related information includes, for example, a flight path of the HAPS 200. The flight related information includes, for example, an attitude of the HAPS 200. The flight related information includes, for example, a movement direction of the HAPS 200. The flight related information includes, for example, a movement speed of the HAPS 200. The flight related information includes, for example, a wind speed around the HAPS 200. The flight related information includes, for example, a solar altitude. The flight related information includes, for example, a solar mid-sun altitude. The flight related information includes, for example, an intensity distribution of light at a flight altitude or a flight point. The flight related information includes, for example, a reflective power at the flight altitude or the flight point. The flight related information includes, for example, a degree of scattering of light at the flight altitude or the flight point. The flight related information includes, for example, an output current amount from the string 231. The flight related information includes, for example, an output voltage from the string 231. In this manner, the flight related information may include a state of energy.

The information acquisition unit 238 may acquire the flight related information from the communication control apparatus 264. The flight related information may include information related to the flight area which is received by the flight control apparatus 262 from another HAPS 200. The flight control apparatus 262 receives wind information including a wind direction and a wind speed of the flight area, for example, from another HAPS 200 flying ahead of its own flying vehicle on a same flight path as the HAPS 200 to which the flight control apparatus 262 is mounted (which may be described as its own flying vehicle) and provides the wind information to the information acquisition unit 238.

The switch control unit 237 switches the switch unit 236 based on the flight related information acquired by the information acquisition unit 238 in a manner that the current from the string 231 is to be supplied to the power conditioner 232 when a state in which the power generation amount by the string 231 is high is estimated or the current from the string 231 is to be supplied to the electric storage unit 234 when a state in which the power generation amount by the string 231 is low is estimated.

For example, when a time period in which the HAPS 200 flies is a predetermined time period set as a time period of sunrise, the switch control unit 237 switches the current from the string 231 to be supplied to the electric storage unit 234. For example, when the time period in which the HAPS 200 flies is a predetermined time period set as a time period of sunset, the switch control unit 237 switches the current from the string 231 to be supplied to the electric storage unit 234. With these configurations, when an amount of solar radiation reaching the string 231 is low and a power generation amount by the string 231 becomes the weak electric power during the time period of sunrise or the time period of sunset, by supplying the weak electric power to the power conditioner 232, waste of the weak electric power can be avoided, and by supplying the weak electric power to the electric storage unit 234, the weak electric power can be stored.

For example, the switch control unit 237 estimates a power generation amount by the string 231 based on a flight path of the HAPS 200 and a power generation amount of the string 231 when the HAPS 200 flew on the flight path in a past, and the current from the string 231 is to be supplied to the electric storage unit 234 when the estimated power generation amount is lower than a predetermined threshold, or the current from the string 231 is to be supplied to the power conditioner 232 when the estimated power generation amount is higher than the threshold.

For example, the switch control unit 237 estimates a gradient of its own flying vehicle to which the switch control unit 237 is mounted based on wind information acquired from another HAPS 200 which flies ahead of its own flying vehicle on a same flight path as its own flying vehicle, estimates a power generation amount by the string 231 based on the estimated gradient of its own flying vehicle, and the current from the string 231 is to be supplied to the electric storage unit 234 when the estimated power generation amount is lower than a predetermined threshold, or the current from the string 231 is to be supplied to the power conditioner 232 when the estimated power generation amount is higher than the threshold.

In the HAPS 200, the wing portion 220 may be transparent, and the photovoltaic unit 230 may have a bifacial photovoltaic panel which can generate electric power on both a front surface and a back surface. In addition, the HAPS 200 may include a front side photovoltaic unit arranged on a front side of the wing portion 220 and a back side photovoltaic unit arranged on a back side of the wing portion 220. In this case, the switch control unit 237 may switch, for each of the front side photovoltaic unit and the back side photovoltaic unit, the generated current to be supplied to the power conditioner 232 or to be supplied to the electric storage unit 234 based on the flight related information. For example, when the sun is positioned on an upper surface side of the HAPS 200, a power generation amount of the front side photovoltaic unit becomes high, and a power generation amount of the back side photovoltaic unit becomes low. In addition, for example, when the sun is positioned on an lower surface side of the HAPS 200, the power generation amount of the front side photovoltaic unit becomes low, and the power generation amount of the back side photovoltaic unit becomes high. In this manner, in the front side photovoltaic unit and the back side photovoltaic unit, tendencies of the power generation amounts are different depending on a situation of the HAPS 200. Therefore, for each of the front side photovoltaic unit and the back side photovoltaic unit, by performing the switching based on the flight related information in a way that suits each of those, a recovery rate of the weak electric power can be increased as compared to a case where no distinction is made between the front side photovoltaic unit and the back side photovoltaic unit.

Figure 7:
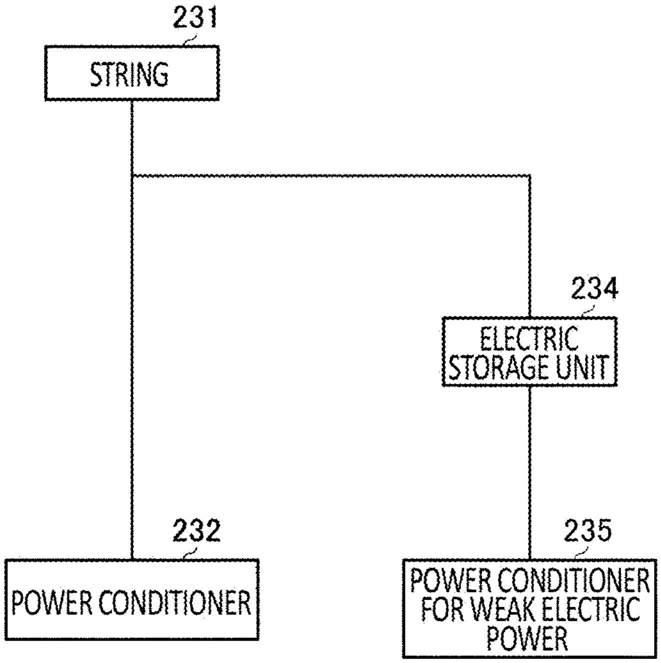
FIG. 7 schematically illustrates an example of the arrangement of the electric storage unit 234.

FIG. 7 schematically illustrates an example of the arrangement of the electric storage unit 234. In the example illustrated in FIG. 7, the electric storage unit 234 is connected to the connection between the string 231 and the power conditioner 232, and the electric power stored in the electric storage unit 234 is supplied to a system other than the power conditioner 232. In the example illustrated in FIG. 7, the electric power stored in the electric storage unit 234 is supplied to a power conditioner for weak electric power 235. For example, the electric power converted by the power conditioner 232 from the electric power generated by the string 231 is be supplied to the motor 242 and the motor 252 included in the HAPS 200, and the electric power supplied to the power conditioner for weak electric power 235 is supplied to a communication related apparatus which can operate even with lower electric power compared to the motor 242 and the motor 252. Examples of the communication related apparatus include the communication control apparatus 264, a positioning sensor, and the like.

Figure 8:
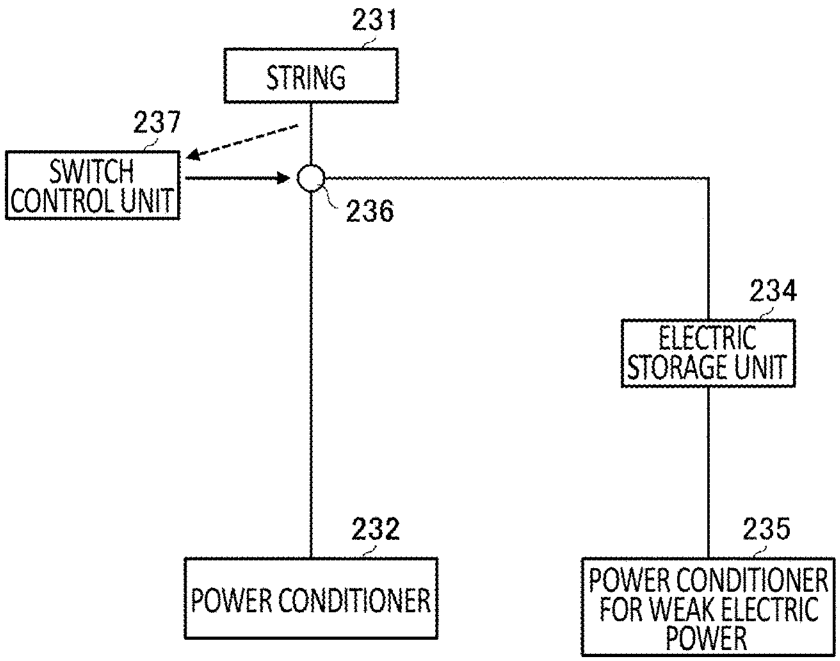
FIG. 8 schematically illustrates an example of the arrangement of the electric storage unit 234.

FIG. 8 schematically illustrates an example of the arrangement of the electric storage unit 234. Here, differences from FIG. 7 will be mainly described. In the example illustrated in FIG. 8, the power generation system 20 includes the switch unit 236 and the switch control unit 237. The switch unit 236 and the switch control unit 237 may be similar to the switch unit 236 and the switch control unit 237 of FIG. 5.

Figure 9:
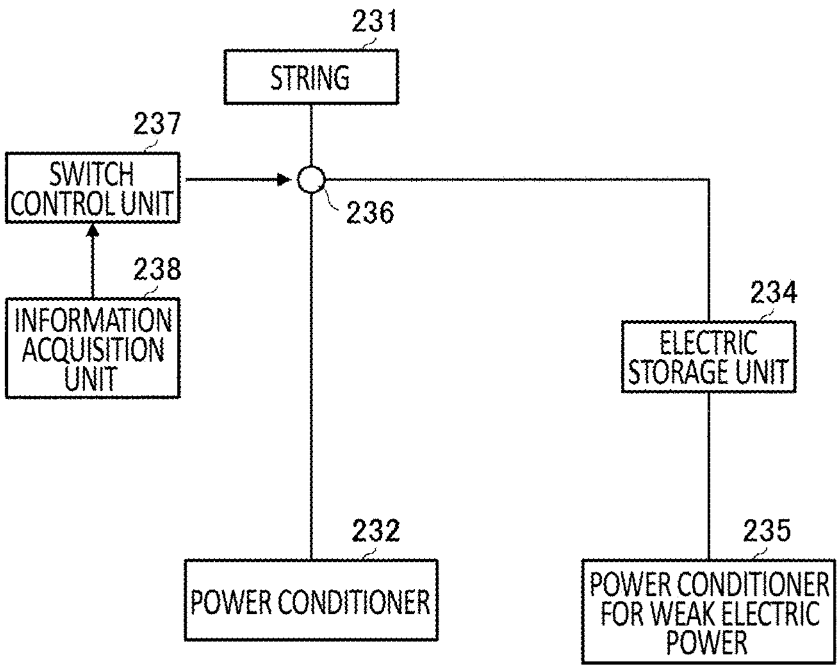
FIG. 9 schematically illustrates an example of the arrangement of the electric storage unit 234.

FIG. 9 schematically illustrates an example of the arrangement of the electric storage unit 234. Here, differences from FIG. 8 will be mainly described. In the example illustrated in FIG. 9, the power generation system 20 further includes the information acquisition unit 238. The information acquisition unit 238 may be similar to the information acquisition unit 238 of FIG. 6.

Figure 10:
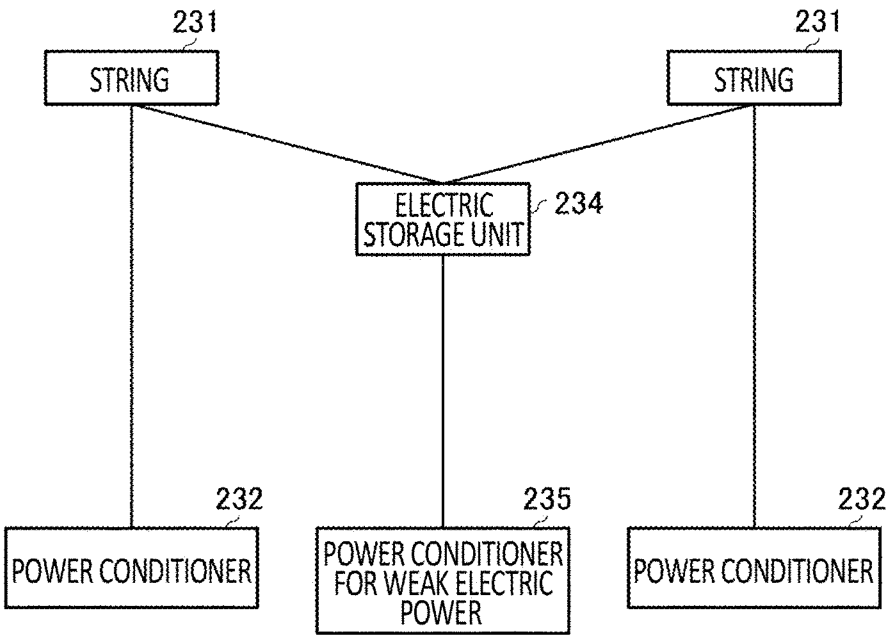
FIG. 10 schematically illustrates an example of the arrangement of the electric storage unit 234.

FIG. 10 schematically illustrates an example of the arrangement of the electric storage unit 234. Here, differences from FIG. 7 will be mainly described. The electric storage unit 234 may be connected to each of connections between a plurality of strings 231 and a plurality of power conditioners 232, and the electric power stored in the electric storage unit 234 may be supplied to a system other than the power conditioner 232. FIG. 10 illustrates an example in which the single electric storage unit 234 is arranged for two combinations of the strings 231 and the power conditioners 232, but the configuration is not limited to this, and the single electric storage unit 234 may be arranged for three or more combinations of the strings 231 and the power conditioners 232. In this manner, by arranging the single electric storage unit 234 for a plurality of combinations of the strings 231 and the power conditioners 232, it is possible to reduce a total weight and costs as compared to a case where the electric storage unit 234 is arranged for each of the plurality of combinations of the strings 231 and the power conditioners 232.

Figure 11:
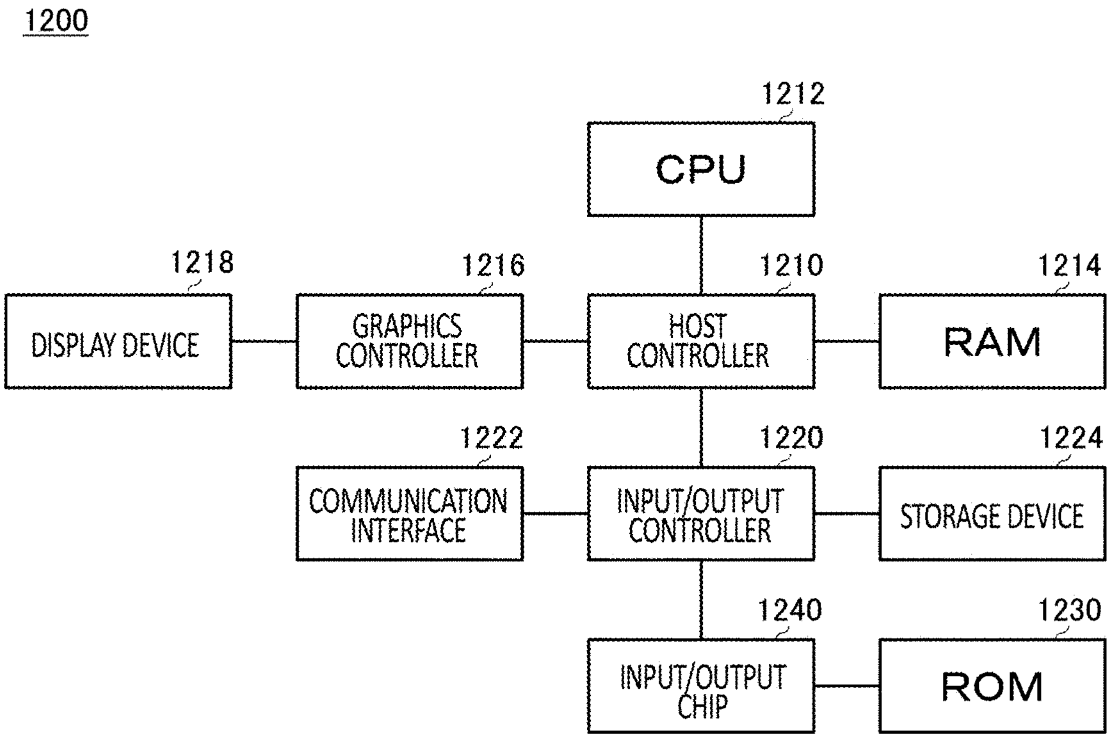
FIG. 11 schematically illustrates an example of a hardware configuration of a computer 1200 which functions as a control apparatus including a switch control unit 237 and an information acquisition unit 238.

FIG. 11 schematically illustrates an example of a hardware configuration of a computer 1200 which functions as a control apparatus including the switch control unit 237 and the information acquisition unit 238. Programs installed in the computer 1200 can cause the computer 1200 to function as one or more "units" of the apparatus according to the embodiment described above or can cause the computer 1200 to execute operations associated with the apparatuses according to the embodiment described above or the one or more "units", and/or can cause the computer 1200 to execute a process according to the embodiment described above or stages of the process. Such a program may be executed by a CPU 1212 to cause the computer 1200 to perform particular operations associated with some or all of the blocks in the flowcharts and block diagrams described in the present specification.

The computer 1200 according to the present embodiment includes the CPU 1212, a RAM 1214, and a graphics controller 1216, which are connected to each other via a host controller 1210. Also, the computer 1200 includes input/output units such as a communication interface 1222, a storage device 1224, a DVD drive and an IC card drive, which are connected to the host controller 1210 via an input/output controller 1220. The storage device 1224 may be a hard disk drive, a solid-state drive, and the like. The computer 1200 also includes a ROM 1230 and a legacy input/output unit such as a keyboard, which are connected to the input/output controller 1220 via an input/output chip 1240.

The CPU 1212 operates in accordance with the programs stored in the ROM 1230 and the RAM 1214, thereby controlling each unit. The graphics controller 1216 acquires image data which is generated by the CPU 1212 in a frame buffer or the like provided in the RAM 1214 or in itself so as to cause the image data to be displayed on a display device 1218.

The communication interface 1222 communicates with other electronic devices via a network. The storage device 1224 stores a program and data used by the CPU 1212 in the computer 1200. The IC card drive reads the program and data from an IC card, and/or writes the program and data to the IC card.

The ROM 1230 stores therein a boot program or the like executed by the computer 1200 at the time of activation, and/or a program depending on the hardware of the computer 1200. The input/output chip 1240 may also connect various input/output units via a USB port, a parallel port, a serial port, a keyboard port, a mouse port, or the like to the input/output controller 1220.

A program is provided by a computer readable storage medium such as the DVD-ROM or the IC card. The program is read from the computer readable storage medium, installed into the storage device 1224, RAM 1214, or ROM 1230, which are also examples of a computer readable storage medium, and executed by the CPU 1212. Information processing written in these programs is read by the computer 1200, and provides cooperation between the programs and the various types of hardware resources described above. An apparatus or method may be configured by implementing the operation or processing of information in accordance with the usage of the computer 1200.

For example, when a communication is performed between the computer 1200 and an external device, the CPU 1212 may execute a communication program loaded in the RAM 1214 and instruct the communication interface 1222 to perform communication processing based on a process written in the communication program. The communication interface 1222, under control of the CPU 1212, reads transmission data stored on a transmission buffer region provided in a recording medium such as the RAM 1214, the storage device 1224, the DVD-ROM, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage device 1224, the DVD drive (DVD-ROM), the IC card, etc., and perform various types of processing on the data on the RAM 1214. Next, the CPU 1212 may write the processed data back into the external recording medium.

Various types of information, such as various types of programs, data, tables, and databases, may be stored in the recording medium to undergo information processing. The CPU 1212 may execute, on the data read from the RAM 1214, various types of processing including various types of operations, information processing, conditional judgement, conditional branching, unconditional branching, information search/replacement, or the like described throughout the present disclosure and designated by instruction sequences of the programs, to write the results back to the RAM 1214. In addition, the CPU 1212 may search for information in a file, a database, or the like in the recording medium. For example, when a plurality of entries, each having an attribute value of a first attribute associated with an attribute value of a second attribute, are stored in the recording medium, the CPU 1212 may search for an entry whose attribute value of the first attribute matches a designated condition, from among the said plurality of entries, and read the attribute value of the second attribute stored in the said entry, thereby acquiring the attribute value of the second attribute associated with the first attribute that satisfies a predetermined condition.

The programs or software module described above may be stored on the computer 1200 or in a computer readable storage medium near the computer 1200. In addition, a recording medium such as a hard disk or a RAM provided in a server system connected to a dedicated communication network or the Internet can be used as the computer readable storage medium, thereby providing the program to the computer 1200 via the network.

Blocks in flowcharts and block diagrams in the present embodiments may represent stages of processes in which operations are executed or "units" of apparatuses responsible for executing operations. A specific step and "unit" may be implemented by a dedicated circuit, a programmable circuit supplied along with a computer readable instruction stored on a computer readable storage medium, and/or a processor supplied along with the computer readable instruction stored on the computer readable storage medium. The dedicated circuit may include a digital and/or analog hardware circuit, or may include an integrated circuit (IC) and/or a discrete circuit. The programmable circuit may include, for example, a reconfigurable hardware circuit including logical AND, logical OR, logical XOR, logical NAND, logical NOR, and another logical operation, and a flip-flop, a register, and a memory element, such as a field programmable gate array (FPGA), a programmable logic array (PLA), or the like.

The computer readable storage medium may include any tangible device capable of storing an instruction executed by an appropriate device, so that the computer readable storage medium having the instruction stored thereon constitutes a product including an instruction that may be executed in order to provide means for executing an operation designated by a flowchart or a block diagram. An example of the computer readable storage medium may include an electronic storage medium, a magnetic storage medium, an optical storage medium, an electromagnetic storage medium, a semiconductor storage medium, etc. More specific examples of computer readable storage medium may include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

The computer readable instructions may include an assembler instruction, an instruction-set-architecture (ISA) instruction, a machine instruction, a machine-dependent instruction, a microcode, a firmware instruction, state-setting data, or either of source code or object code written in any combination of one or more programming languages including an object-oriented programming language such as SMALLTALK (registered trademark), JAVA (registered trademark), and C++, or the like, and a conventional procedural programming language such as a "C" programming language or a similar programming language.

The computer readable instruction may be provided to a general purpose computer, a special purpose computer, or a processor or programmable circuit of another programmable data processing apparatus locally or via a local area network (LAN), a wide area network (WAN) such as the Internet or the like in order that the general purpose computer, the special purpose computer, or the processor or the programmable circuit of another programmable data processing apparatus executes the computer readable instruction to generate means for executing operations designated by the flowchart or the block diagram. Examples of the processor include a computer processor, a processing unit, a microprocessor, a digital signal processor, a controller, a microcontroller, and the like.

While the present invention has been described by way of the embodiments, the technical scope of the present invention is not limited to the scope described in the above-described embodiments. It is apparent to persons skilled in the art that various alterations or improvements can be made to the above-described embodiments. It is also apparent from the described scope of the claims that the embodiments added with such alterations or improvements can be included the technical scope of the present invention.

It should be noted that the operations, procedures, steps, stages or the like of each process performed by an apparatus, system, program, and method shown in the scope of the claims, embodiments, or diagrams can be performed in any order as long as the order is not indicated by "prior to," "before," or the like and as long as the output from a previous process is not used in a later process. Even if the process flow is described by using phrases such as "first", "then" or the like in the scope of the claims, embodiments, or diagrams, it does not necessarily mean that the process must be performed in this order.

With use of the present invention, a power generation efficiency per weight of the solar cell can be improved, and the solar cell that is lighter and can generate more electric power can be achieved. Since it is conceivable to use the solar cell to be brought to a disaster site, for example, to supply energy to victims or the like, it is possible to achieve Sustainable Development Goals (SDGs) such as Goal 7 "Affordable and clean energy", Goal 13 "Take specific action to combat climate change", or the like.

EXPLANATION OF REFERENCES

20: power generation system; 30: network; 40: gateway; 50: communication satellite; 60: satellite communication station; 70: user terminal; 200: HAPS; 202: beam; 204: communication area; 220: wing portion; 230: photovoltaic unit; 231: string; 232: power conditioner; 234: electric storage unit; 235: power conditioner for weak electric power; 236: switch unit; 237: switch control unit; 238: information acquisition unit; 240: propeller; 242: motor; 244: PDU; 250: elevator; 252: motor; 254: SDU; 260: central portion; 262: flight control apparatus; 264: communication control apparatus; 270: pod; 280: battery; 290: bus; 400: management apparatus; 1200: computer; 1210: host controller; 1212: CPU; 1214: RAM; 1216: graphics controller; 1218: display device; 1220: input/output controller; 1222: communication interface; 1224: storage device; 1230: ROM; and 1240: input/output chip.

What is claimed is:

1. A power generation system comprising:

a photovoltaic unit arranged in a flight vehicle which provides a wireless communication service to a user terminal in a communication area formed over a ground;

an electric storage unit which is connected to the photovoltaic unit and stores electric power generated by the photovoltaic unit;

a power conditioner which converts the electric power generated by the photovoltaic unit; and a switch control unit which switches a current from the photovoltaic unit to be supplied to the power conditioner or to be supplied to the electric storage unit;

wherein an input and an output of the electric storage unit are connected to a connection line that connects the photovoltaic unit and the power conditioner, such that the electric storage unit is connected in parallel to connection between the photovoltaic unit and the power conditioner, and the electric power stored in the electric storage unit is supplied to the power conditioner; and the switch control unit switches the current from the photovoltaic unit to be supplied to the power conditioner when a measurement result of a power generation amount by the photovoltaic unit is higher than a predetermined threshold or the current from the photovoltaic unit to be supplied to the electric storage unit when the measurement result is lower than the threshold.

2. A flight vehicle that is the flight vehicle comprising the power generation system according to claim 1, the flight vehicle further comprising:

a flight control apparatus which controls a flight of the flight vehicle by using the electric power converted by the power conditioner.

3. The power generation system of claim 1, wherein the power conditioner includes an MPPT (Maximum Power Point Tracking) device.

4. A power generation system comprising:

a photovoltaic unit arranged in a flight vehicle which provides a wireless communication service to a user terminal in a communication area formed over a ground;

an electric storage unit which is connected to the photovoltaic unit and stores electric power generated by the photovoltaic unit;

a power conditioner which converts the electric power generated by the photovoltaic unit; and a switch control unit which switches a current from the photovoltaic unit to be supplied to the power conditioner or to be supplied to the electric storage unit;

wherein the electric storage unit is connected between the photovoltaic unit and the power conditioner, such that the photovoltaic unit, the electric storage unit, and the power conditioner are connected in series, and the electric power stored in the electric storage unit is supplied to the power conditioner; and the switch control unit switches the current from the photovoltaic unit to be supplied to the power conditioner when a measurement result of a power generation amount by the photovoltaic unit is higher than a predetermined threshold or the current from the photovoltaic unit to be supplied to the electric storage unit when the measurement result is lower than the threshold.

5. A flight vehicle that is the flight vehicle comprising the power generation system according to claim 4, the flight vehicle further comprising:

a flight control apparatus which controls a flight of the flight vehicle by using the electric power converted by the power conditioner.

6. A power generation system comprising:

a photovoltaic unit arranged in a flight vehicle which provides a wireless communication service to a user terminal in a communication area formed over a ground;

an electric storage unit which is connected to the photovoltaic unit and stores electric power generated by the photovoltaic unit;

a power conditioner which converts the electric power generated by the photovoltaic unit; and a switch control unit which switches a current from the photovoltaic unit to be supplied to the power conditioner or to be supplied to the electric storage unit;

wherein one terminal of the electric storage unit is connected to a connection line that connects the photovoltaic unit and the power conditioner and another terminal of the electric storage unit is connected to a system other than the power conditioner, and the electric power stored in the electric storage unit is supplied to the system other than the power conditioner; and the switch control unit switches the current from the photovoltaic unit to be supplied to the power conditioner when a measurement result of a power generation amount by the photovoltaic unit is higher than a predetermined threshold or the current from the photovoltaic unit to be supplied to the electric storage unit when the measurement result is lower than the threshold.

7. The power generation system according to claim 6, wherein the photovoltaic unit includes a plurality of photovoltaic units, the power conditioner includes a plurality of power conditioners, the electric storage unit is connected to each of connections between the plurality of photovoltaic units and the plurality of power conditioners, and the electric power stored in the electric storage unit is supplied to the system other than the power conditioner.

8. The power generation system according to claim 6, wherein the electric power converted by the power conditioner from the electric power generated by the photovoltaic unit is supplied to a motor included in the flight vehicle, and the electric power stored in the electric storage unit is supplied to a communication related apparatus in connection to communication by the flight vehicle.

9. A flight vehicle that is the flight vehicle comprising the power generation system according to claim 6, the flight vehicle further comprising:

a flight control apparatus which controls a flight of the flight vehicle by using the electric power converted by the power conditioner.

10. A power generation system comprising:

a photovoltaic unit arranged in a flight vehicle which provides a wireless communication service to a user terminal in a communication area formed over a ground;

an electric storage unit which is connected to the photovoltaic unit and stores electric power generated by the photovoltaic unit;

a power conditioner which converts the electric power generated by the photovoltaic unit;

a switch control unit which switches a current from the photovoltaic unit to be supplied to the power conditioner or to be supplied to the electric storage unit; and an information acquisition unit which acquires flight related information in connection to a flight of the flight vehicle wherein an input and an output of the electric storage unit are connected to a connection line that connects the photovoltaic unit and the power conditioner, such that the electric storage unit is connected in parallel to connection between the photovoltaic unit and the power conditioner, and the electric power stored in the electric storage unit is supplied to the power conditioner; and the switch control unit switches the current from the photovoltaic unit to be supplied to the power conditioner or to be supplied to the electric storage unit based on the flight related information.

11. The power generation system according to claim 10, wherein the switch control unit switches, based on the flight related information, the current from the photovoltaic unit to be supplied to the power conditioner when a state in which a power generation amount by the photovoltaic unit is high is estimated or the current from the photovoltaic unit to be supplied to the electric storage unit when a state in which a power generation amount by the photovoltaic unit is low is estimated.

12. The power generation system according to claim 10, wherein the switch control unit switches the current from the photovoltaic unit to be supplied to the electric storage unit when a time period in which the flight vehicle flies is a predetermined time period set as a time period of sunset.

13. The power generation system according to claim 10, wherein the flight vehicle has a front side photovoltaic unit arranged on a front side of a wing portion of the flight vehicle and a back side photovoltaic unit arranged on a back side of the wing portion, and the switch control unit switches, for each of the front side photovoltaic unit and the back side photovoltaic unit, a generated current to be supplied to the power conditioner or to be supplied to the electric storage unit based on the flight related information.

* * * * *